US010222937B2

(12) United States Patent
Wallace et al.

(10) Patent No.: US 10,222,937 B2
(45) Date of Patent: Mar. 5, 2019

(54) SYSTEM AND METHOD FOR VARIANT CONTENT NAVIGATION

(71) Applicant: Prinova, Inc., Toronto (CA)

(72) Inventors: Matthew Wallace, Kitchener (CA); Andrew Lehman, Waterloo (CA); Jeff Janssen, Waterloo (CA)

(73) Assignee: Messagepoint Inc., Toronto (CA)

( * ) Notice: Subject to any disclaimer, the term of this patent is extended or adjusted under 35 U.S.C. 154(b) by 328 days.

(21) Appl. No.: 14/488,605

(22) Filed: Sep. 17, 2014

(65) Prior Publication Data

US 2015/0082193 A1    Mar. 19, 2015

Related U.S. Application Data

(60) Provisional application No. 61/879,715, filed on Sep. 19, 2013.

(51) Int. Cl.
| | | |
|---|---|---|
| *G06F 8/34* | (2018.01) | |
| *G06F 3/0482* | (2013.01) | |
| *G06F 17/24* | (2006.01) | |
| *G06Q 30/02* | (2012.01) | |

(52) U.S. Cl.
CPC .............. *G06F 3/0482* (2013.01); *G06F 8/34* (2013.01); *G06F 17/243* (2013.01); *G06Q 30/0204* (2013.01); *G06Q 30/0251* (2013.01)

(58) Field of Classification Search
CPC ............ G06Q 30/0251; G06Q 30/0204; G06F 17/211; G06F 17/243; G06F 8/34; H04N 21/854

See application file for complete search history.

(56) References Cited

U.S. PATENT DOCUMENTS

| | | | | |
|---|---|---|---|---|
| 5,666,502 A | * | 9/1997 | Capps | G06F 3/0489 715/236 |
| 5,920,866 A | * | 7/1999 | Crim | G06F 17/30306 |
| 6,073,112 A | | 6/2000 | Geerlings | |
| 6,101,486 A | | 8/2000 | Roberts et al. | |
| 6,397,222 B1 | * | 5/2002 | Zellweger | G06F 17/3089 707/783 |
| 6,424,995 B1 | * | 7/2002 | Shuman | G06F 9/4443 709/206 |

(Continued)

FOREIGN PATENT DOCUMENTS

| | | |
|---|---|---|
| EP | 2242016 A1 | 10/2010 |
| JP | 2004213636 A  * | 7/2004 |

(Continued)

OTHER PUBLICATIONS

European Search Report for Application EP14185301. Whole document.

(Continued)

*Primary Examiner* — Alvin H Tan
(74) *Attorney, Agent, or Firm* — McMillan LLP

(57) ABSTRACT

A method and system for managing hierarchical content having a plurality of messages where a navigation widget with message zones receives messages from a message database. When a message zone is selected, a message list is updated to show only those messages specific to that message zone. When a message from the message list is selected, the message zone renders a preview of the selected message within the message zone.

18 Claims, 18 Drawing Sheets

(56) References Cited

U.S. PATENT DOCUMENTS

| | | | |
|---|---|---|---|
| 7,587,411 B2* | 9/2009 | De Vorchik | G06F 17/30235 |
| 7,966,560 B2* | 6/2011 | Kanzaki | G06F 9/4443 |
| | | | 715/255 |
| 9,418,068 B2* | 8/2016 | Maloney | G06F 17/30056 |
| 2002/0112035 A1 | 8/2002 | Carey et al. | |
| 2003/0126146 A1 | 7/2003 | Van Der Riet et al. | |
| 2004/0095394 A1* | 5/2004 | Fox | G06F 3/0481 |
| | | | 715/800 |
| 2004/0103017 A1 | 5/2004 | Reed et al. | |
| 2005/0021404 A1 | 1/2005 | Schoder et al. | |
| 2005/0039119 A1 | 2/2005 | Parks et al. | |
| 2005/0091109 A1 | 4/2005 | Howard et al. | |
| 2006/0173744 A1 | 8/2006 | Kandasamy et al. | |
| 2006/0179404 A1* | 8/2006 | Yolleck | G06F 17/243 |
| | | | 715/272 |
| 2006/0193008 A1 | 8/2006 | Osaka et al. | |
| 2007/0186193 A1* | 8/2007 | Curran | G06Q 10/109 |
| | | | 715/780 |
| 2007/0240054 A1* | 10/2007 | Todoroki | G06F 9/4443 |
| | | | 715/700 |
| 2007/0283279 A1* | 12/2007 | Barnes | G06Q 10/107 |
| | | | 715/752 |
| 2008/0046267 A1* | 2/2008 | Romano | G06Q 10/06 |
| | | | 705/1.1 |
| 2008/0186537 A1* | 8/2008 | Isobe | G06F 17/212 |
| | | | 358/1.15 |
| 2010/0325175 A1* | 12/2010 | Chiba | G06F 17/248 |
| | | | 707/805 |
| 2011/0010656 A1* | 1/2011 | Mokotov | G06F 3/0481 |
| | | | 715/780 |
| 2011/0246900 A1* | 10/2011 | Hedges | G11B 27/034 |
| | | | 715/738 |
| 2012/0066601 A1* | 3/2012 | Zazula | H04N 21/854 |
| | | | 715/733 |
| 2012/0084644 A1* | 4/2012 | Robert | G06F 17/30126 |
| | | | 715/255 |
| 2012/0185800 A1* | 7/2012 | Hart | G06F 3/04817 |
| | | | 715/810 |

FOREIGN PATENT DOCUMENTS

| | | | |
|---|---|---|---|
| WO | 2001057689 A1 | 8/2001 | |
| WO | 2009060310 A2 | 7/2008 | |

OTHER PUBLICATIONS

European Search Report for Application EP14185355. Whole document.

International Search Report for WO2009060310 issued by WIPO dated Jul. 1, 2010. Whole document.

Written Opinion of International Searching Authority for WO2009060310 issued by WIPO dated May 12, 2010. Whole document.

International Preliminary Report on Patentability for WO2009060310 issued by WIPO dated May 18, 2010.

Anonymous: "Widget (GUI)—Wikipedia, the free encyclopedia", Apr. 27, 2013 (Apr. 27, 2013), XP055295196.

* cited by examiner

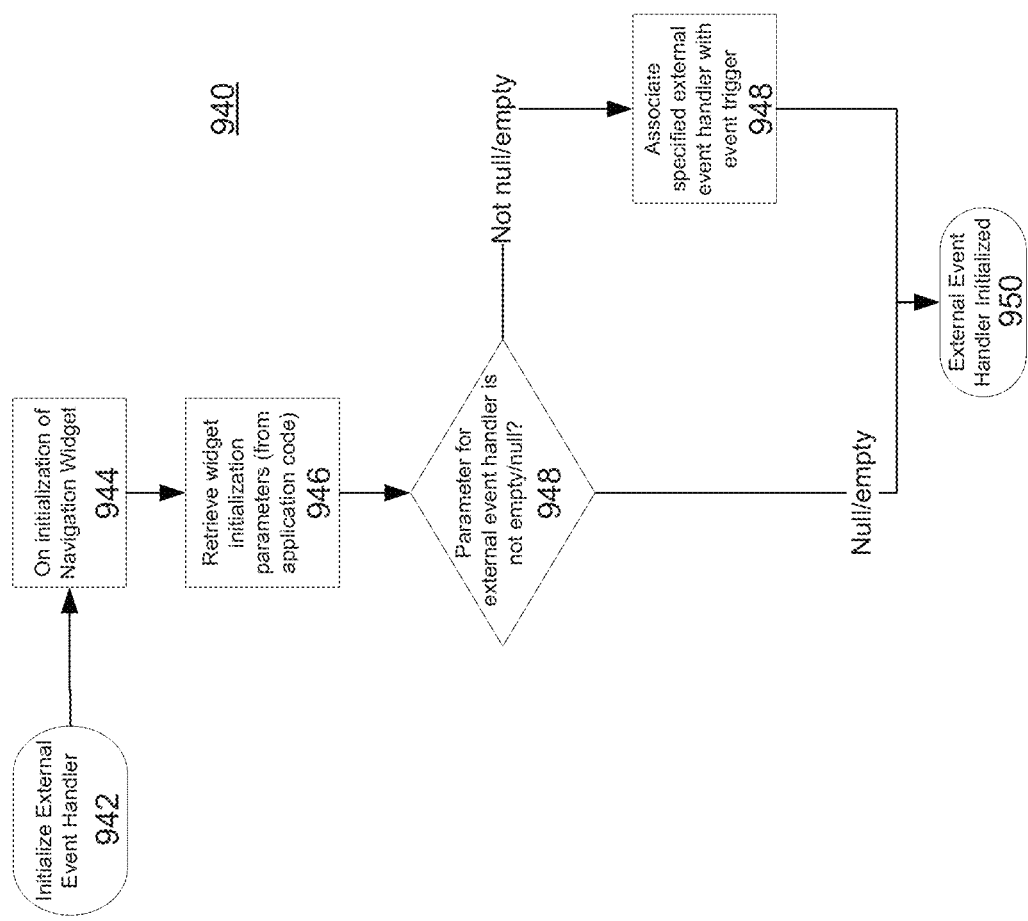

SYSTEM AND METHOD FOR VARIANT CONTENT NAVIGATION

FIELD OF THE INVENTION

The present invention relates generally to content management. More particularly, the present invention relates to a method and system for navigating content for customer communications management.

BACKGROUND OF THE INVENTION

Typically large businesses with a large customer population (for example, the financial services, banking, health care, retail, utilities, telecommunications and insurance industries) have significant difficulty providing one-to-one personalization of the information they provide to customers and prospects. Businesses can communicate with customers through many different mediums such as physical documents (e.g. paper), electronic documents, online (e.g. web-based content), telephone or face-to-face interaction. These points of contact between the customer and the business or products are commonly called touchpoints.

As the number of customers increases and in order to provide economies of scale, the content in the touchpoints must be generalized when using traditional techniques in order for the touchpoint to reach the broadest customer base. Document engineering services provide composition toolsets for delivering print, and more recently web content to large recipient bases. Examples of these deliveries include bank statements, policy documentation, legal documentation and account summaries. The variability in content delivered within a particular document has historically been limited. Fragments of data, such as, account balances, transaction summaries and recipient summaries are varied on a per customer basis; however, dramatically changing significant sections of content based on demographic, transactional or other types of stored customer data has proved to be technically difficult and/or labor intensive.

Businesses are recognizing that customer interactions are made more effective by providing relevant, personalized information to their customers during interactions rather than standard, boiler-plate content. Moreover, to improve businesses' customer relationships, there is a need to better manage these customer touchpoints. One example of software to facilitate management of these customer touchpoints is sold by Prinova Software Inc. of Toronto, Ontario, Canada under the name Messagepoint® further disclosed in U.S. Published Patent Application Number 2008/0046267 and incorporated herein by reference. Messagepoint® offers facilities for targeting content to individual recipients. For example, an investment firm may wish to promote a new fund to customers with investments greater than a defined minimum threshold who have previously invested in similar funds. Messagepoint® achieves this objective by managing content, targeting rules, messaging strategy and coordination with a composition tool responsible for generating the final media channel.

Although Messagepoint® provides businesses with useful functionality, the targeting mechanism becomes inadequate when faced with the high scale, hierarchically structured data sets applied by almost all businesses. The subject application further simplifies management of hierarchically-based variant content by improving navigation thereof.

SUMMARY OF THE INVENTION

In accordance with an aspect of the invention, there is provided a system and machine implemented method for managing hierarchical content from a plurality of messages including a document composition server having a message database containing the plurality of messages stored on a first computer readable medium and computer executable instructions on a second computer readable medium for displaying a user interface with a navigation widget and a message list, the navigation widget having a plurality of message zones for receiving message content from the message database; selecting a message zone and updating the message list to show only those messages specific to that message zone from the message database; and selecting a message from the message list and rendering the message content in the message zone for the selected message.

According to one aspect of the invention, the navigation widget has a plurality of sections. The sections can be changed by selecting at least one section change button. When the dimensions of the section are changed, the message zone is automatically scaled to the changed dimensions.

According to another aspect of the invention, highlighting or shading the selected message zone.

According to another aspect of the invention, the navigation widget can be for a print media or an electronic media. If the navigation widget is for print media, rendering the message based on predetermined dimensions. If the navigation widget is for electronic media, rendering the message for a screen of a display.

Yet another aspect of the invention, editing the message and updating the navigation widget with the edited message.

Another aspect of the invention is displaying a temporary message preview window when a mouse pointer hovers over a message in the message list.

BRIEF DESCRIPTION OF THE DRAWINGS

An embodiment will now be described, by way of example only, with reference to the attached Figures, wherein:

FIG. 9B is a flowchart for initializing an event handler of the present invention;

DETAILED DESCRIPTION OF THE EMBODIMENT

The present invention relates to providing hierarchically-based variant content for integrated messaging campaigns. Touchpoints disseminate information, point of contact or way to communicate with a user, such as a customer, potential customer, client, or individuals or organizations. Examples of touchpoints are print media, websites, email, direct mail, banner ads, bills, telephone conversations, information displayed at a kiosk, digital signage (interactive or not), advertising on billboards, a script for a customer service representative, bus stop benches, outside overhead displays, compliance documents, SEC filings, and any other channel for providing information to a target audience. The customer may be exposed to information via a letter, a website (RSS feed, tweet, Facebook® post, etc), compliance documents, email, a kiosk, or ATM (automatic teller machine), direct mail, or cellular phone text message or instant message.

Figure 1:
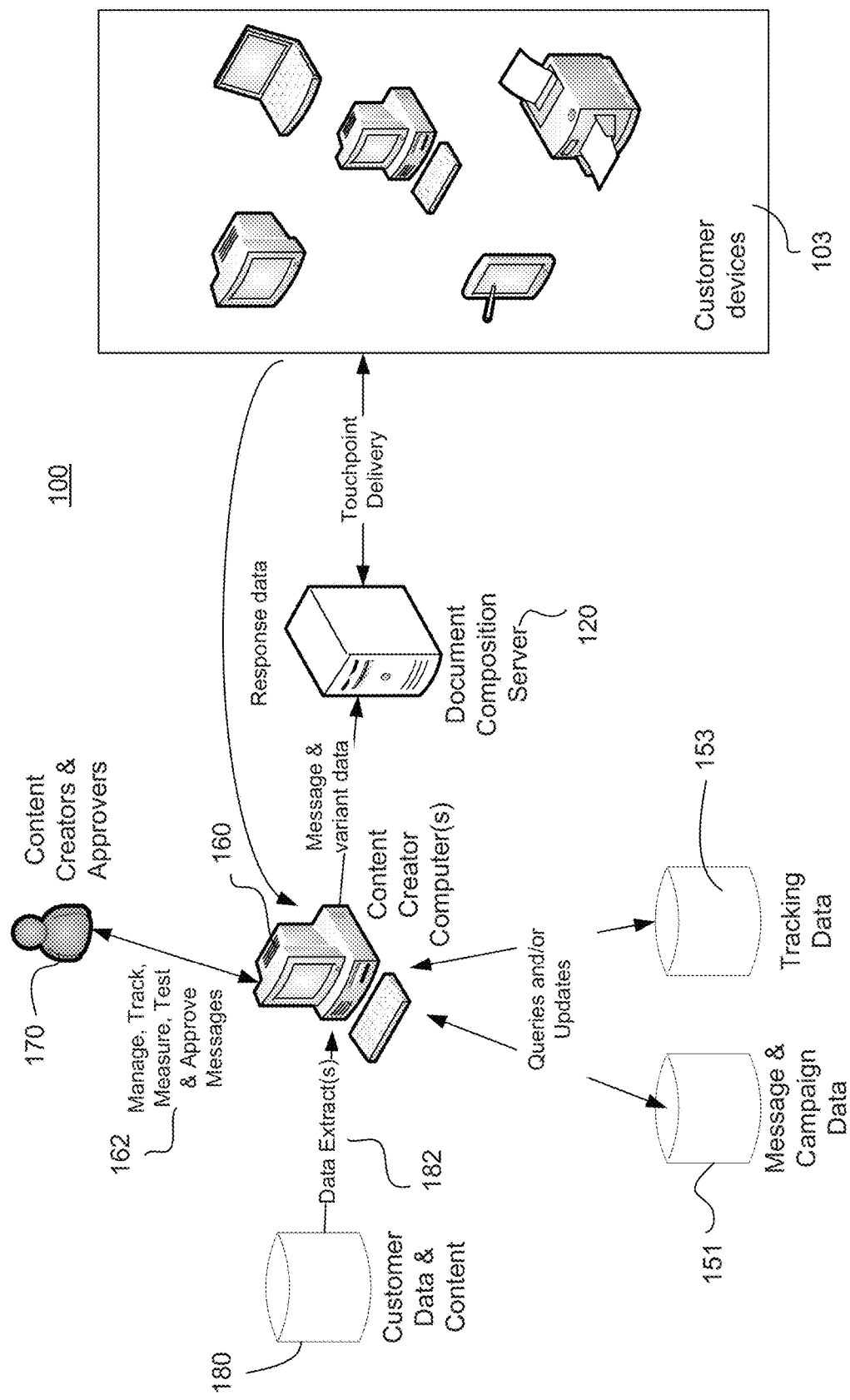
FIG. 1 illustrates a high-level architecture of the touchpoint generating system for providing touchpoint variants in accordance with an embodiment of the invention and its operating environment.
Figure 2:
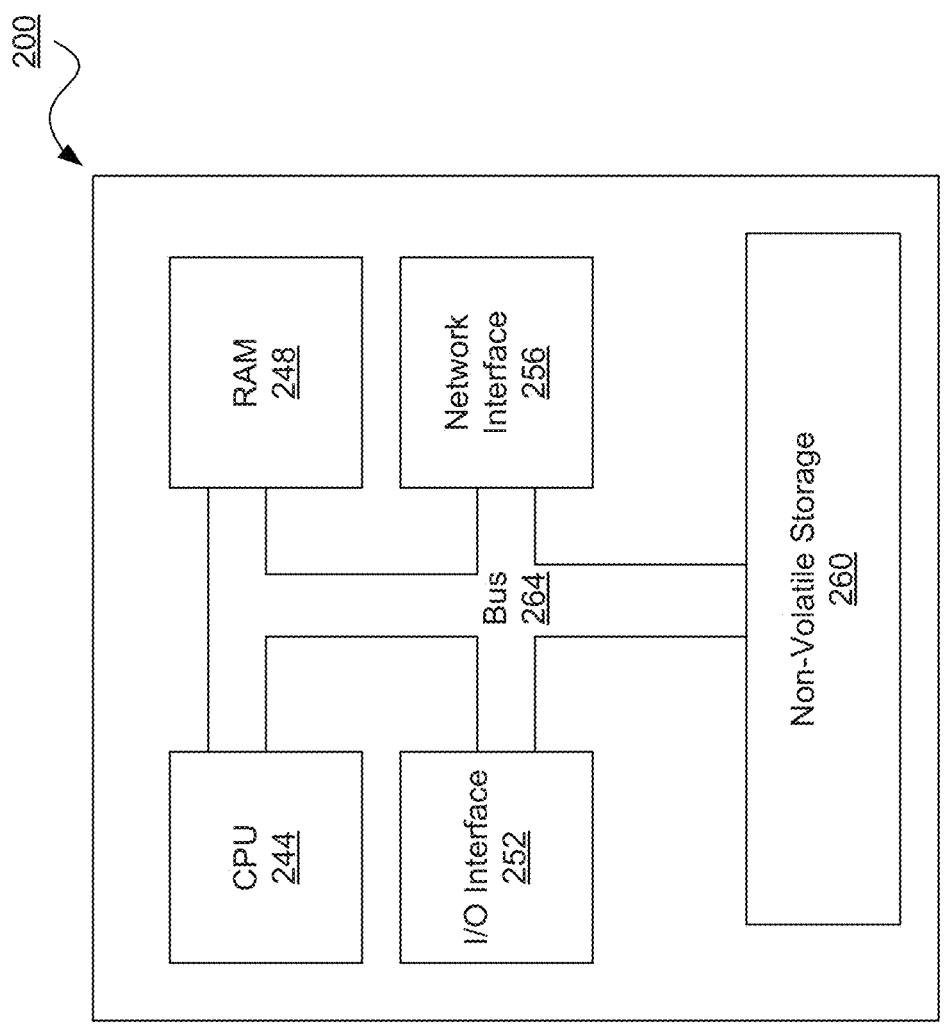
FIG. 2 shows a schematic diagram of computing device executing instructions of the present invention.

FIGS. 1 and 2 illustrates one embodiment of the system for generating a plurality of touchpoints. As shown in FIG. 1, system 100 includes customer data and content databases 180, business and IT users 170, content creator computer(s) 160 executing the instructions of the present invention, message and campaign database 151, tracking database 153, document composition server 120 and customer devices 103. Each of these is described in more detail below.

The content creator computer(s) 160 has a number of physical and logical components, including one or more central processing units 244 (referred to hereinafter as "CPU"), non-volatile random access memory ("RAM") 248, an input/output ("I/O") interface 252, a network interface 256 (wired or wireless), non-volatile storage 260, and a local bus 264 enabling the CPU 244 to communicate with the other components. The CPU 244 executes an operating system and the application instructions of the present invention. RAM 248 provides relatively-responsive volatile storage to the CPU 244. The I/O interface 252 allows for input to be received from one or more devices, such as a keyboard, a mouse, a touch screen, etc., and outputs information to output devices such as a display and/or speakers. The network interface 256 permits communication with other computing devices such as, for example, the document composition engine 120. Non-volatile storage 260 stores the operating system and programs including computer-executable instructions for implementing the instructions of the present invention, as well as data received by the external databases, and data being processed by the instructions. During operation of the content creator computer(s) 160, the operating system, the programs and the data may be retrieved from the non-volatile storage 260 and placed in RAM 248 to facilitate execution.

The content creator computer(s) 160 is operated by the content creator(s) (and optionally approvers) 170 in order to manage, track, measure, test and approve messages 162 as well as plan and layout variants for the touchpoints using the I/O interface 252. The content creator computers(s) 160 receives data from customer data and content database 180 over the network interface 256. The customer data and content data are used by the content creator 170 in order to create the variation selectors for each message and each touchpoint. When the content creator 170 is creating the touchpoint variants and messages, the application software performs queries and updates to the message and campaign database 151 over the network interface 256. The message and campaign database 151 stores all the previously created message and touchpoint variants. The messages and variant data are delivered to the document composition server 120 over the network interface 256.

The document composition server 120 is typically a processing system similar to the one shown in FIG. 2. The server 120 receives one or more files as inputs from the content creator computer 160 and generates as outputs one or more rendered touchpoint variants for a targeted customer device 103. For example, the same variant can be rendered for customer devices can be such as a display, laptop, personal computer, mobile phone, or AFP print streams for printing via high volume printers, or PDF outputs for archiving or electronic delivery. For example, the server 120 can implement a web page delivery module that generates and delivers web page data that includes the message data and touchpoint variants generated by content creator computer 160. Similarly email delivery module generates and delivers an email including the message data. One of skill in the art would know that other modules specific to other communication mediums or protocols can also be implemented such as and SMS text messaging module, or a Twitter™ module, or a Facebook® module, etc.

To assess the performance of each touchpoint variant, the content creator computer 160 receives response data from customer devices 103 and updates a tracking database 153 that stores tracking data relating to feedback from customers or other information relating to who received the message data, who responded to the message data and what the response was. The response data may be input from members of the target audience who have viewed the message data and provided a comment, request for additional information or other feedback.

The content creator computer 160, in conjunction with the document composition server 120 contain software instructions for creating, managing and composing hierarchies as further described below.

Business and IT users 170 are typically business management personnel and/or IT personnel that interface with the customer data and edit, revise, measure, approve, test and track the dynamic message content. The revisions or approvals of the messages are provided to the messagepoint module 160 via the network interface 256.

A touchpoint layout has one or more sections and within each section are one or more message zones. The section dimensions constrain the size of the zone dimensions and zones are persisted using relative sizing (e.g. a percentage of the section display width and length). As a result, if an associated section changes dimensions, all the associated zones scale accordingly.

For each variation, a message must be generated by the content author. The variants are typically determined by first segmenting the recipient base, that could number in the millions, into unique subsets. For example, a recipient base could be segmented based on carrier, contract, group or region, or division. From this perspective each segment of interest is receiving a complete set of content which may be slightly or significantly different than the set of content received by another segment. The content creator then must determine if each segment requires entirely new messaging and/or targeting in order to determine the number and type of variants required. If a set of variants require only minor tweaks to the content, then the same layout and structure of the touchpoint can probably be maintained the same while changing the messaging content for each particular segment. If necessary, every aspect of the touchpoint can be varied segment to segment.

The need to target the message by segment can be met by applying targeting to content such that every segment is represented; however, the end result is a massive multiplier of content with little correlation. Attempting to decipher the content for any particular variation is unintuitive, labor intensive and inefficient. Variant content management brings order to this problem of complexity and permits elaborate variant interrelationships while remaining easily discoverable and intuitive. From the perspective of the content author each variant becomes is its own snapshot of content, interacting with other variant content as necessary, but contained and managed independently.

There are two models of variation: Structured Touchpoint variation, and Free-form Touchpoint variation. Both models of variation start with a Standard Touchpoint. The Standard Touchpoint is used when the segment is relatively uniform and the content creator requires a simple touchpoint requiring no variation. The Standard Touchpoint is driven through individual messages using targeting rules and a single touchpoint layout. Once a Standard Touchpoint has been created, the content creator may start adding variations to this master template.

The Structured Touchpoint variation is used for complex touchpoints with many variants and content is driven by unique definitions (representing customer segments or subsegments) at the touchpoint level. Mutually-exclusive segments are used to define the touchpoint variation as well as the universe of associated content for a specific touchpoint variation. The majority of the content and targeting is very similar or even the same between touchpoint variations with only minor tweaking and customization is required. The messaging structure is clearly defined at the top template level and propagates down to the variants below. A large amount of content is shared, referenced, or inherited across multiple touchpoints and across multiple segments. A collection of messages for a given variant is very similar to other variants in a collection of touchpoints allowing a consistent structure to be used between the variants. The content can vary within the structure and content inheritance is supported.

The Flexible (or Free-form) Touchpoint variation is used for complex touchpoints with many variants where a majority of the content and targeting is different between the touchpoint variations. It is used when little commonality exists apart from core purpose and targeted segment for the touchpoint. The messaging structure can be re-defined and varied throughout the variation hierarchy, but the content variation is driven at the message level for each touchpoint. Similar to the Structured Touchpoint variation, the Flexible Touchpoint variation use mutually-exclusive segments to define the universe of potential touchpoint variations; however, they do not determine the individual content for each variant as little to no content is shared or inherited across multiple touchpoint variations or across multiple segments.

The individual content is driven by the message-level targeting of each touchpoint variation allowing each variation to have their own unique structure and content. A collection of messages for a given variant can be fundamentally different between variants in a collection of touchpoint variations. Nevertheless, message inheritance is supported. Through the use of message and content inheritance, the content creator only has to identify and manage exceptions across all the variations versus having to identify and manage all the rules. If a change is made at a higher level in the inheritance chain, the change only has to be approved at that point at which time it is propagated everywhere automatically.

Figure 3A:
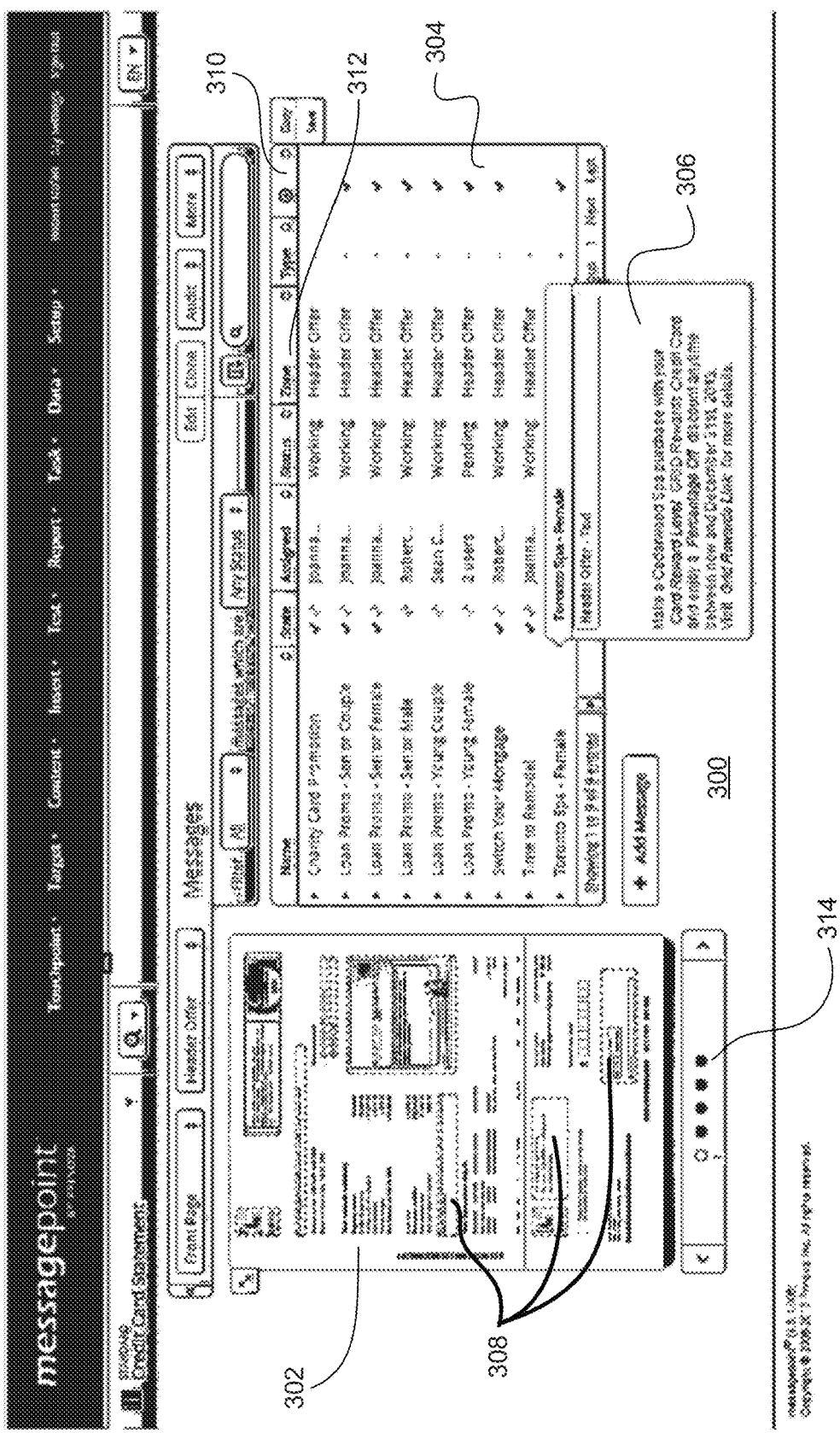
FIG. 3A is a screen capture of a window demonstrating a Standard Touchpoint.

FIGS. 3A to 3F are windows demonstrating an exemplary graphical user interface of the present embodiment. FIG. 3A shows a window 300 for authoring a standard touchpoint with no variation. A preview of the touchpoint 302 shows the general layout of the touchpoint where areas enclosed by dotted lines 308 correspond to the message zones. A message list 304 shows all the messages stored in the message and campaign database 151 that are being sent to the variant shown in the navigation widget 302. The navigation widget 302 shows a specific section of the touchpoint where the sections can be changed by selecting the section change buttons 314 below the navigation widget 302. When a message zone 308 is not selected, the message list 304 shows all messages related to the section that is currently shown. When the content creator selects a different section change button 314, the message list 304 is updated to show the messages related to the selected section.

When a message zone 308 is selected in the navigation widget 302, the message list 304 changes to only list the messages corresponding to that message zone 308 as further described with reference to FIGS. 3D and 3F below. If the content creator desires to view a preview of the message, hovering the mouse pointer over one of the messages in the message list 304 causes the message preview window 306 to display. The message list 304 has a column 310 that indicates whether target information exists for that particular message and column 312 that shows what particular zone the message applies.

Figure 3B:
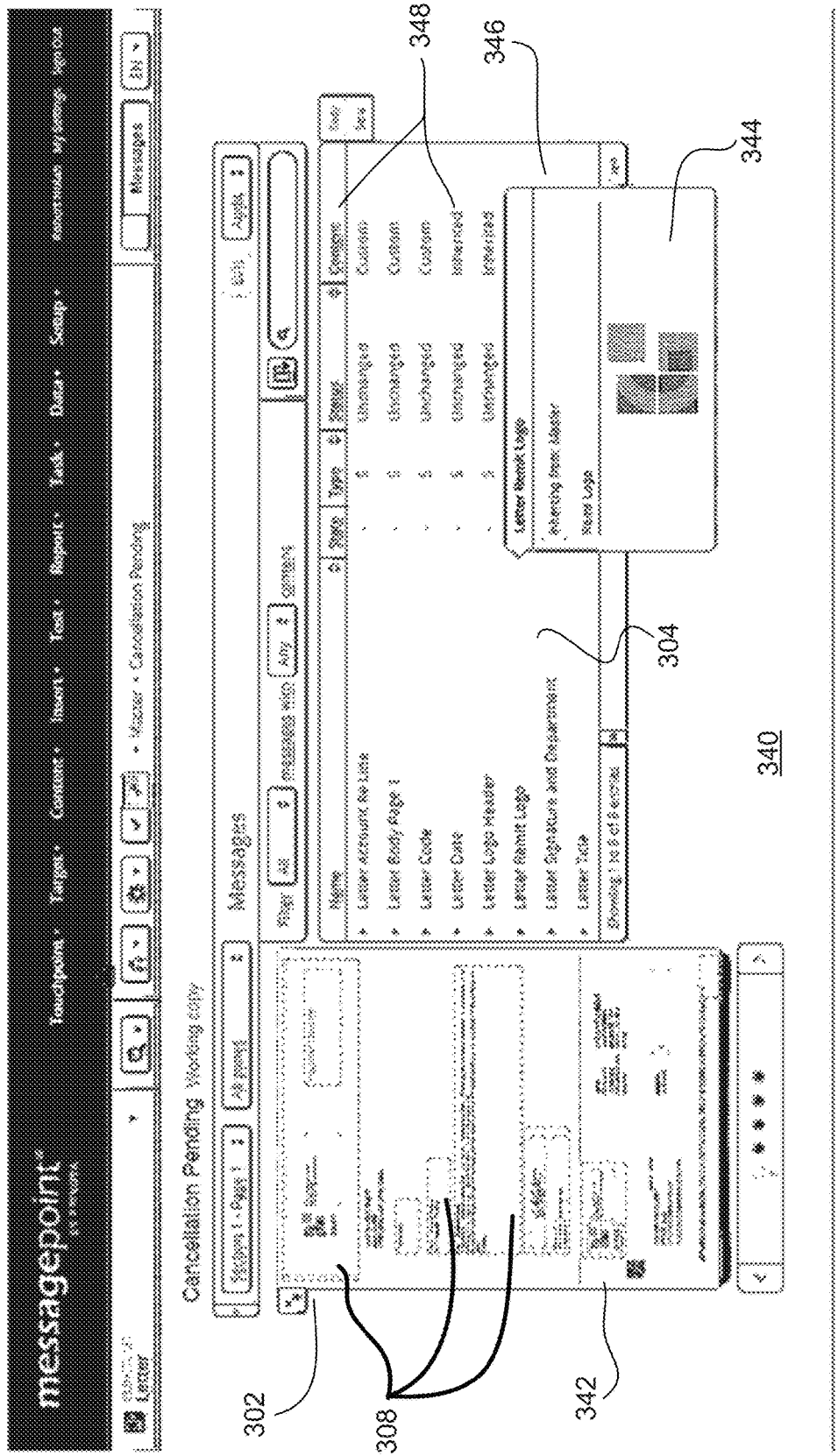
FIG. 3B is a screen capture of a window demonstrating a Structured Touchpoint variation.

FIG. 3B demonstrates a window 340 for authoring a structured touchpoint variation. The window 340 is very similar to the window 300 of the standard touchpoint where there is a navigation widget 342 with message zones 308, a message preview 344 and a message list 346. Instead of having a column for target information 310, it has been replaced by a column 348 that indicates whether the message zone of the variant has been customized, inherited, or suppressed.

Figure 3C:
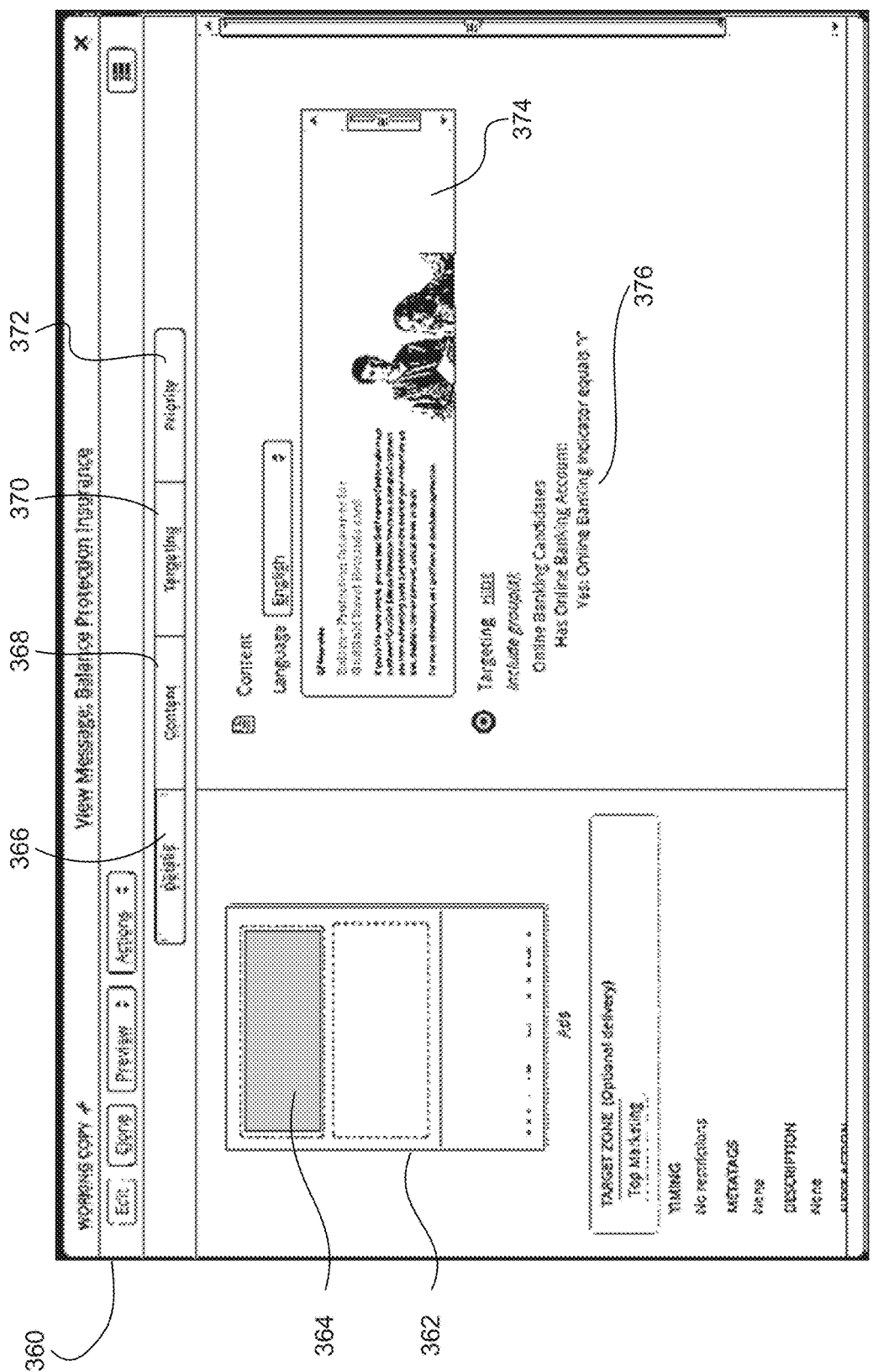
FIG. 3C is a screen capture of a window for modifying a message.

FIG. 3C shows a message preview window 360 which similarly has a preview of the touchpoint 362 that highlights which message zone 364 for the message currently being created or modified. The message editing window 360 has four buttons: Details, Content, Targeting, and Priority. The currently selected button is Details 366 which provides an overview of the structure of the message. The Content button 368 displays content editing tools for the message. The Targeting button 370 displays a tool for selecting to whom the message should be addressed. Finally, the Priority button 372 displays a tool for specifying what priority to give the particular message. For the Details view, a small preview window 374 of the content is displayed as well as a list 376 of the targeting rules for the current message.

Figure 3D:
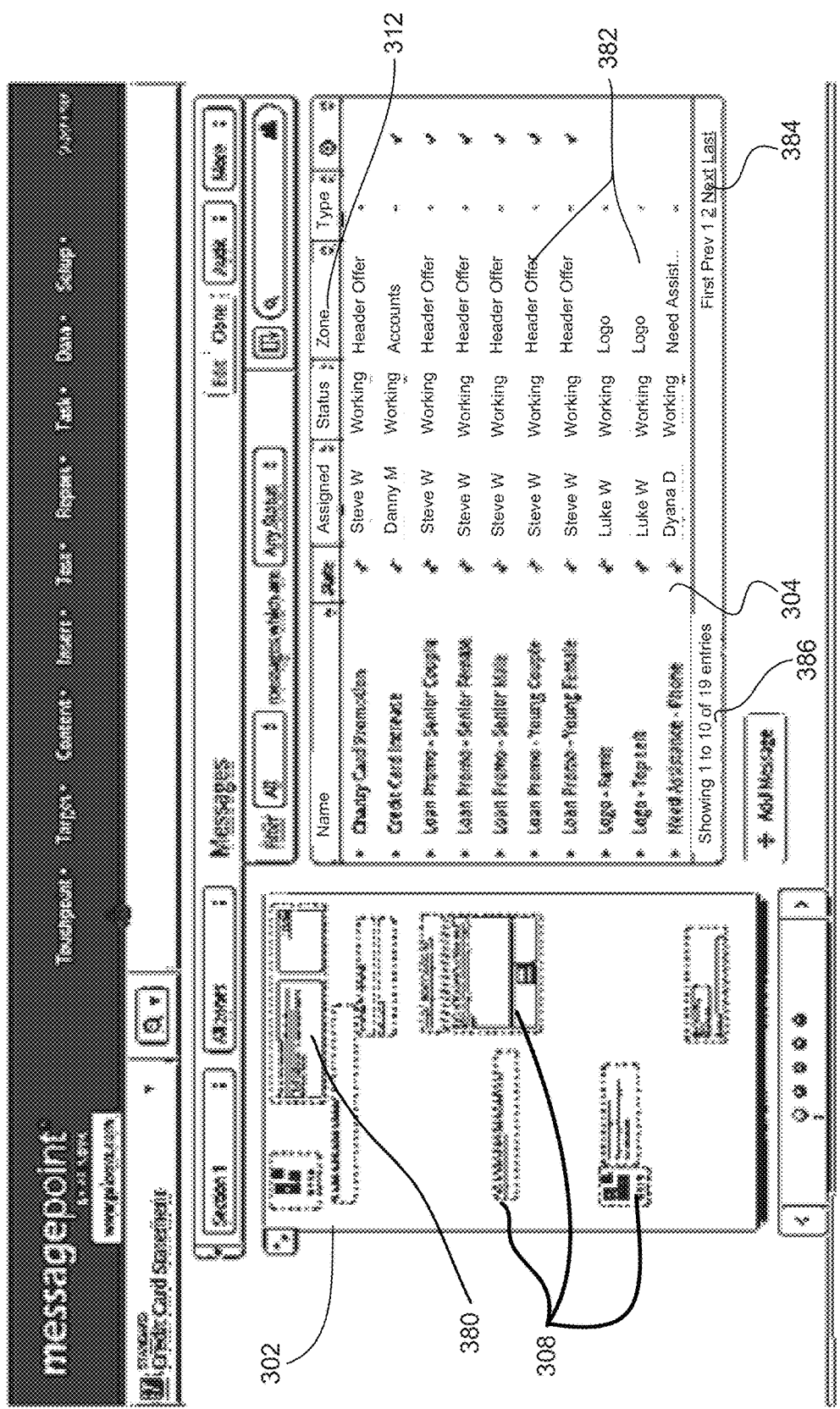
FIG. 3D is a screen capture of a window having no message zones selected.
Figure 3E:
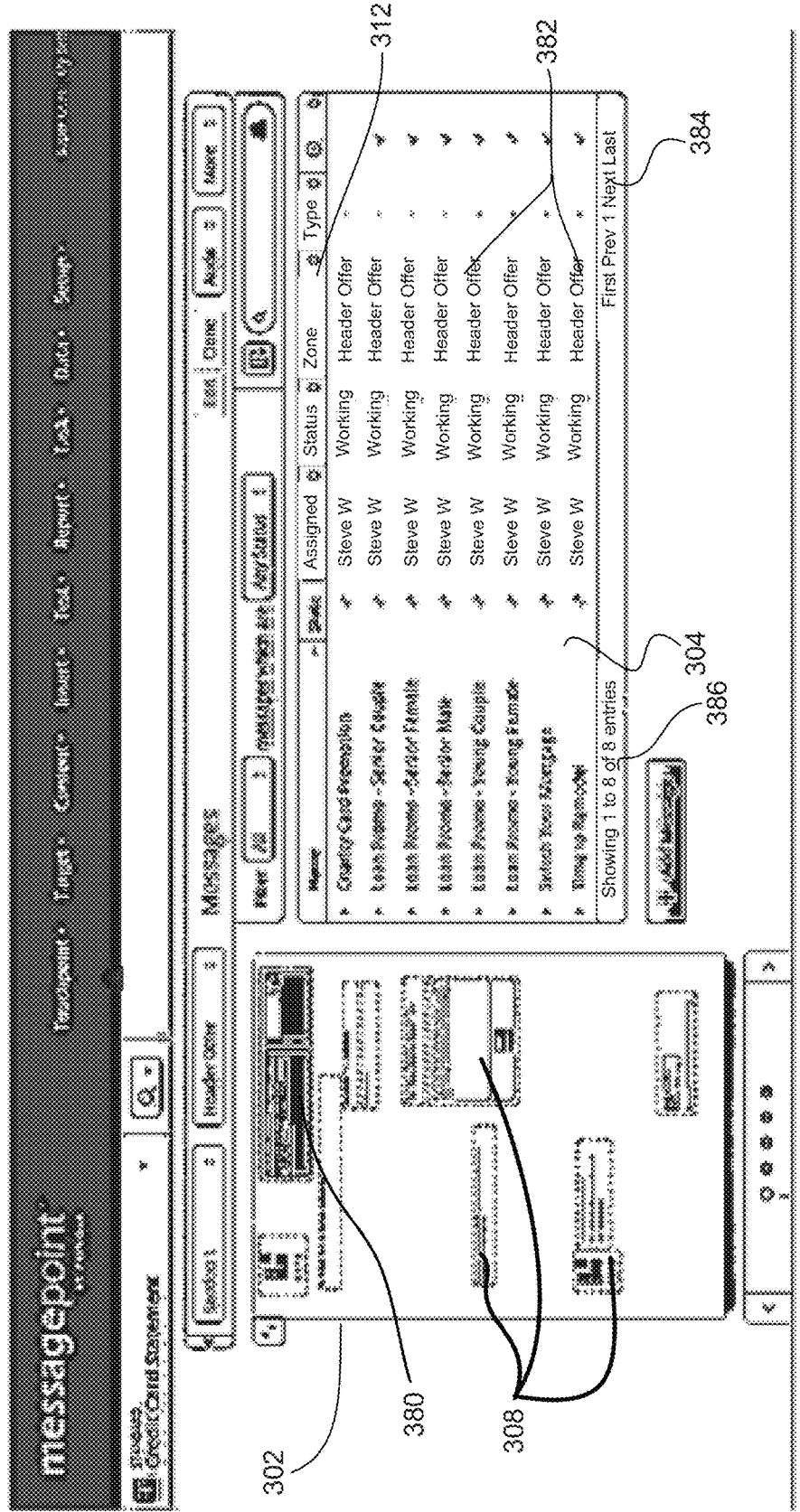
FIG. 3E is a screen capture of a window having one message zone selected.

FIGS. 3D and 3E demonstrate another aspect of the present invention. A touchpoint may have a large number of variants with which management can become burdensome to the content creator. The navigation widget 302 has a plurality of message zones 308 of which message zone 380 is of particular interest in this example. As shown in FIG. 3D, the navigation widget 302 has no selected message zones. Message list 304 shows all of the messages for this particular navigation widget 302 because no specific message zone has been selected. As can be seen in the Zone column 312, the list 382 has many different names for different zones such as "Header Offer", "Logo", etc. The name of the message zone 308 is customizable and the content creator typically chooses a name that is clearly identifiable to them. The status line 386 which displays the number of messages 386 in the current message list 304 and the number on the current page. Prior to selecting a particular message zone, the status lines 386 reads "Showing 1 to 10 of 19 entries" corresponding to the first 10 messages of all the messages of this section. Navigation buttons 384 allow the content creator to go to navigate between pages in the message list 304.

When a content creator wants to view or edit a particular message zone 308, the content creator selects the message zone 308 causing it to be highlighted like message zone 380 in FIG. 3E. When the message zone 380 is selected, message list 304 changes to display only the messages relevant to that message zone 380. In the example, the message zone 380 for a header offer is selected and therefore the message list 304 displays the 8 entries in the status 386. Further, the zone column 312 shows only entries that are header offers 382.

When a particular row in the message list 304 is selected, the selected message zone 380 is rendered with the content corresponding to the selected message as described in further detail below. If the message content is edited, the selected message zone 380 is re-rendered.

Figure 3F:
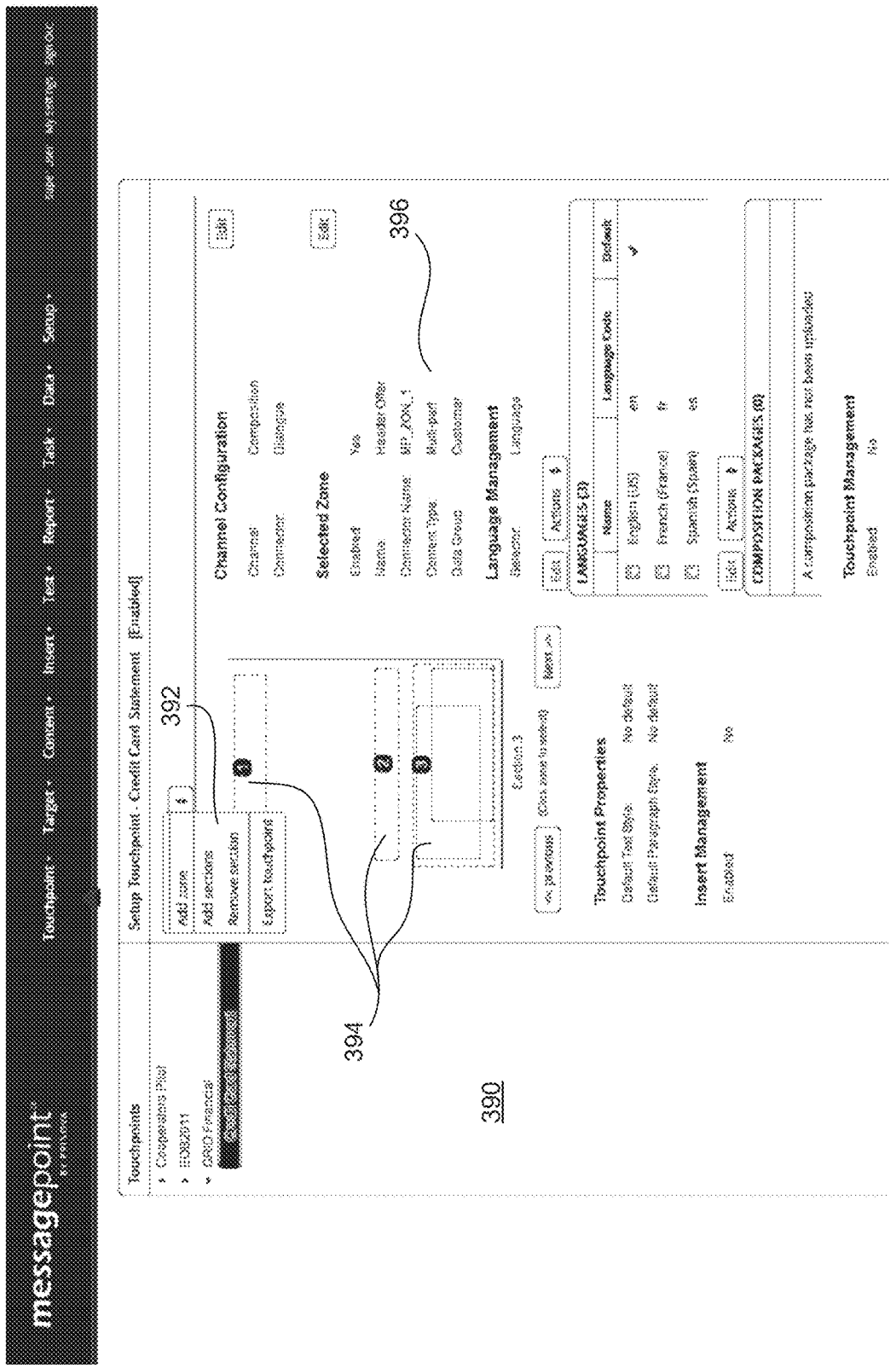
FIG. 3F is a screen capture of touchpoint setup window.

FIG. 3F is an example of a touchpoint setup interface 390 of the present invention. In this interface 390, the content creator is able add zones, add sections, remove sections, and export the touchpoint for importation on another computer via the drop down message box 392. The interface 390 also displays a navigation widget 302 with message zones 394. Selecting a message zone 394 changes the status information displayed in 396 that can be edited by the content creator.

Figure 4:
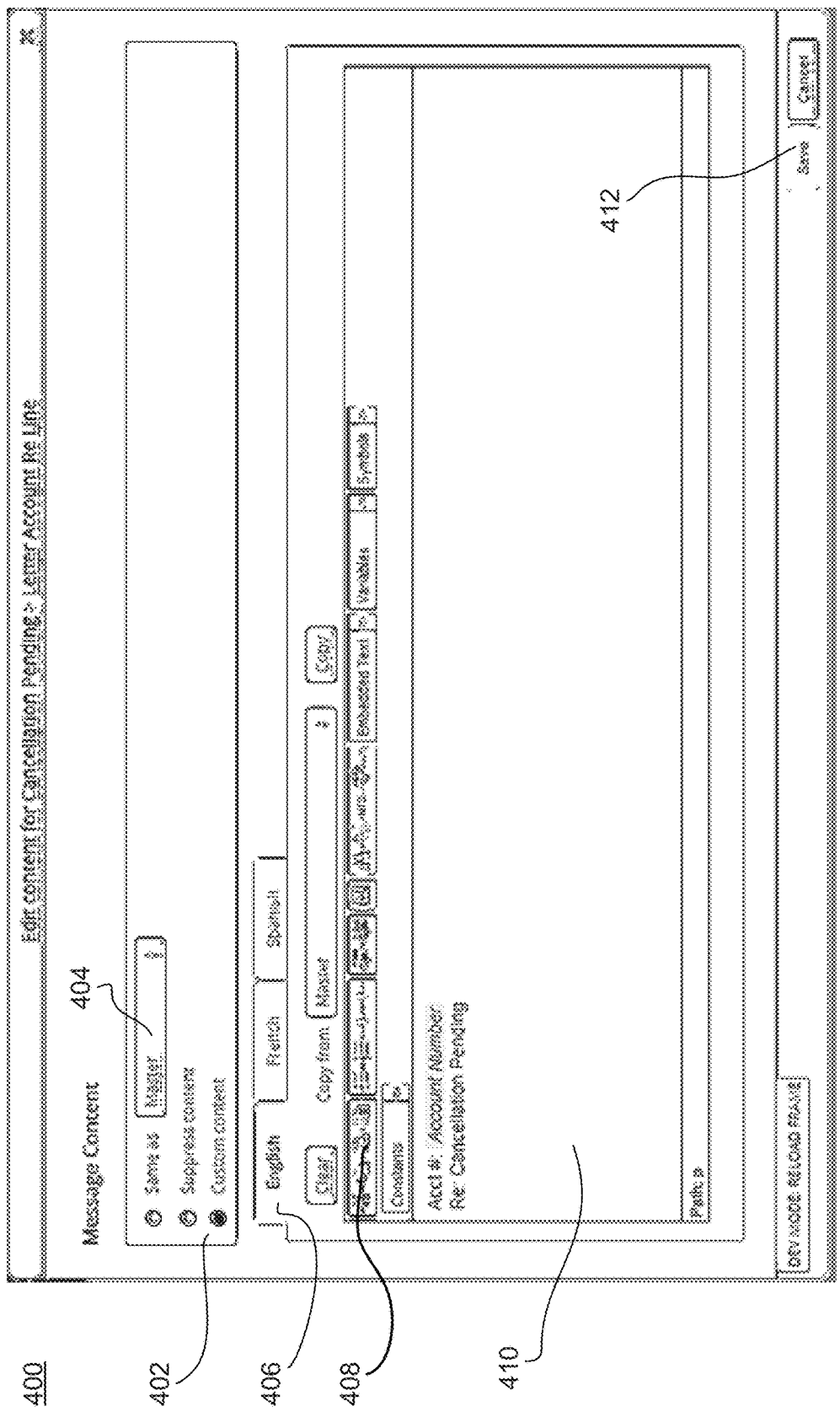
FIG. 4 is a screen capture of a window for modifying inheritance properties of the present invention.

FIG. 4 shows a window 400 for editing a message zone of the present embodiment. The content creator sets the message content to be the same as the parent, to suppress the content, or the customize content using the radio button 402. If the content creator sets the message content to be the same as the parent, a dropdown 404 allows the content creator to select from any of the higher levels in the hierarchy. When the content creator selects suppress content, the contents of the higher levels in the hierarchy will not be displayed. Finally, if the content creator selects custom content, content editing area 410 is displayed (as shown in this figure). The content creator is able to select from a variety of languages 406 such as English, French, or Spanish although the inventor contemplates that other language tabs are possible based on market need. The content creator is able to change font size and other common editing functions in the toolbar 408. Once the content creator is satisfied with the selections made, the changes are saved using the save button 412.

Figure 5:
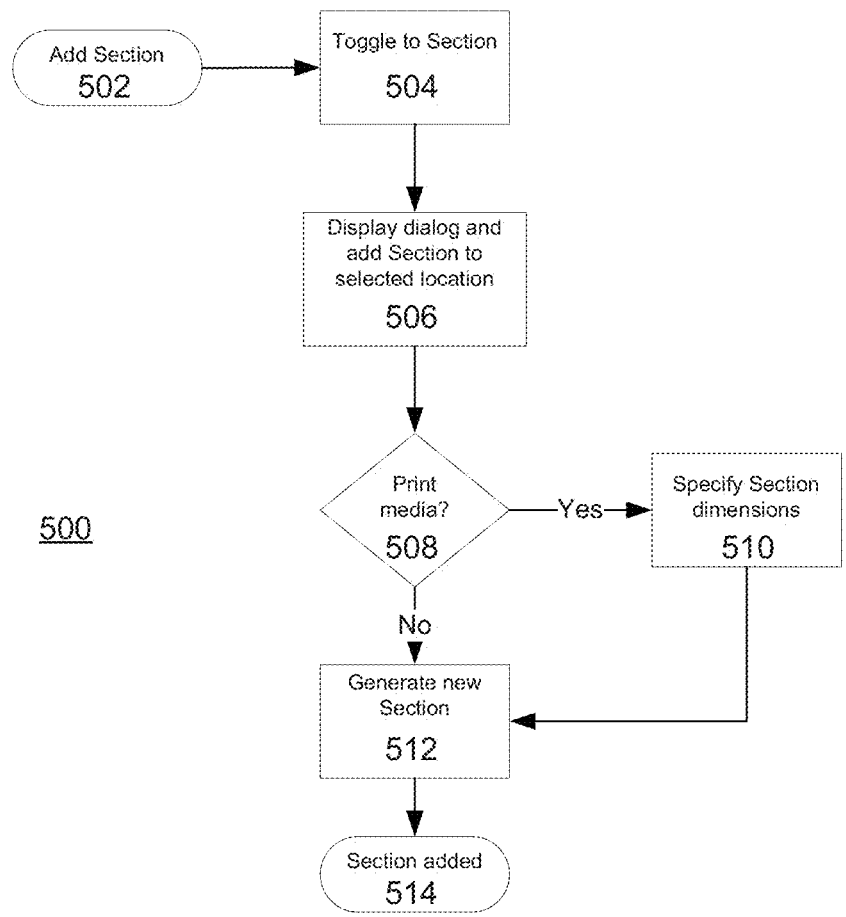
FIG. 5 is a flowchart for creating a new section in a touchpoint of the present invention.

FIG. 5 is a flowchart 500 demonstrating the steps for adding a section to a touchpoint. The process starts at 502 when the content creator desires to add a section to the touchpoint. The content creator selects a section change button 314 which in step 504 specifies a start point for where the section is to be added. In step 506, a pop-up dialog box is displayed asking the user to specify the number of sections to be added as well as whether to add the sections after the current section, before the current section, at the beginning of the touchpoint or at the end of the touchpoint. Depending on the content creator's selection, the algorithm adds a section in the selected location. A check 508 is performed to determine if the touchpoint is specific to print media. If the touchpoint is for print media then the content creator is asked to specify the dimensions 510 of the newly added section. Digital media sections are fixed and will fill the available display area when presented emulating the properties of the display or window in the case of a windowed operating system environment. A new section is then generated either with dimensions at step 512 if the section is a print media section or it is generated without dimensions if it is not a print media section. The process exits at step 514.

Figure 6:
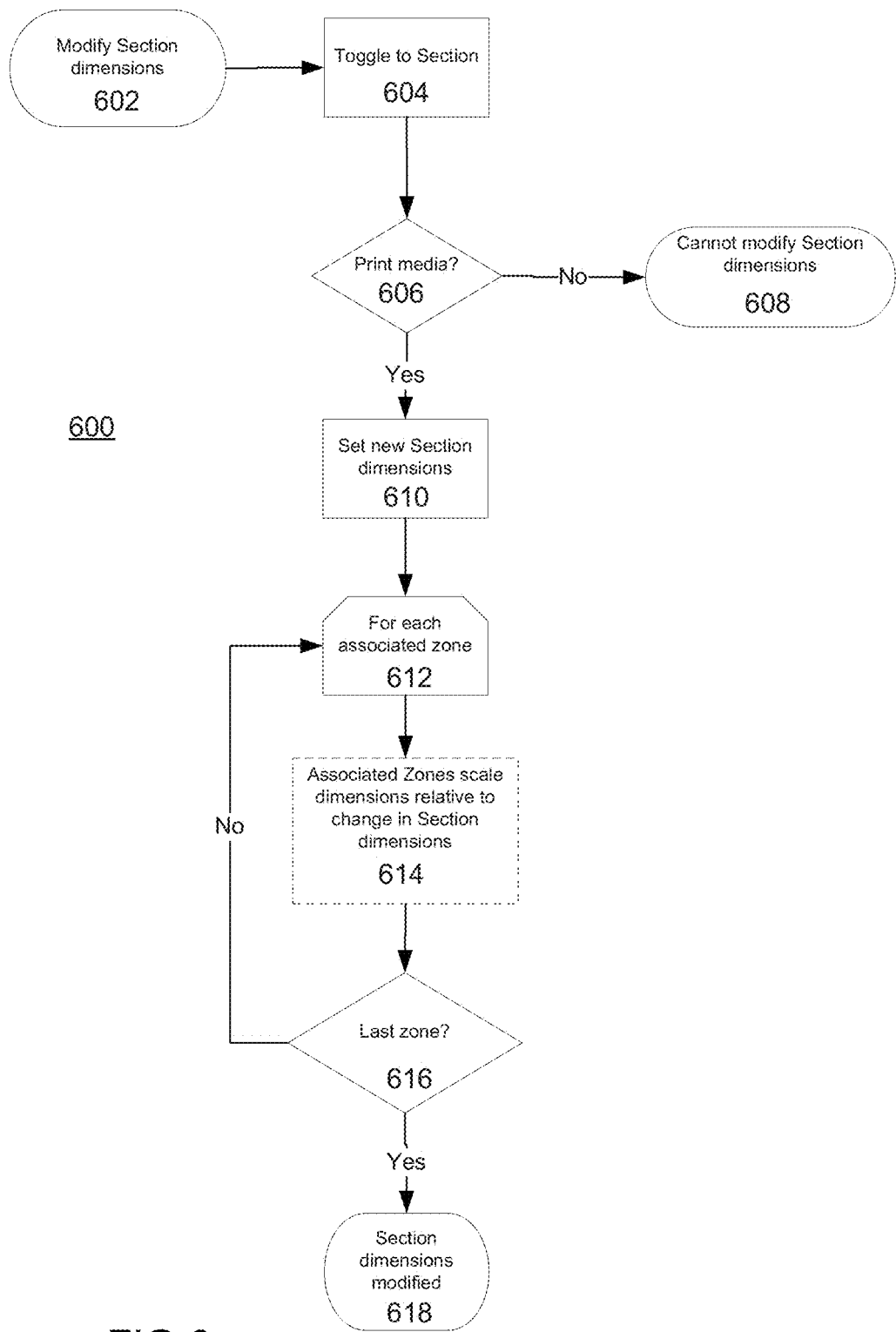
FIG. 6 is a flowchart for modifying the dimensions of a section in a touchpoint of the present invention.

FIG. 6 is a flowchart 600 that starts at 602 for modifying the dimensions of a section. The content creator selects an existing section causing the navigation widget to display the selected section at step 604. A check 606 is performed to determine if the touchpoint for print media. If the touchpoint is not for print media, the dimensions cannot be modified 608 and the process terminates. If the touchpoint is for print media, the new dimensions are set in step 610 using input from the content creator. For each zone within the section 612, the associated zones are scaled relative to the change in the section dimensions 614. Once the last zone is resized 616, the process exits at step 618.

Figure 7:
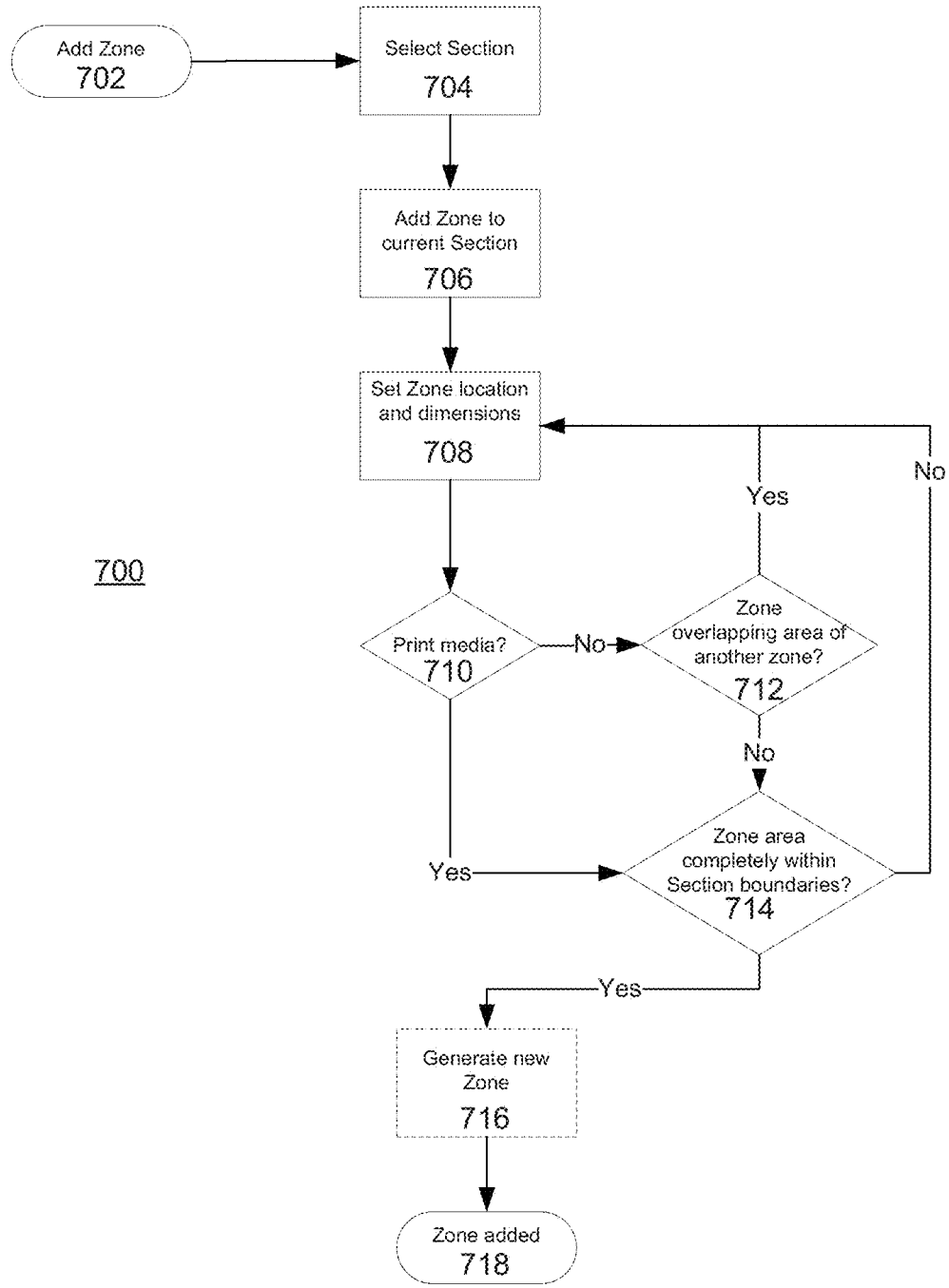
FIG. 7 is a flowchart for adding a zone to a section of a touchpoint of the present invention.

FIG. 7 demonstrates a flowchart 700 for adding zones to sections. The process is entered at 702 when the content creator selects the add zone option in the drop down message box 392. The content creator selects the section at 704 indicating the section to which to add the new zone. A zone is added to the current section in 706 and the zone location and dimensions are adjusted 708 to those specified by the content creator. The process then performs a check to see if the touchpoint is for print media 710. If not, the process checks in the newly created zone is overlapping another pre-existing zone 712. If so, the content creator is asked to revise the zone location and dimensions by returning to 708. If the zone is not overlapping then a check is made in 714 to ensure the zone area is completely within the section boundaries. If not, the content creator is asked to revise the zone location and dimensions by returning to 708. This same test is also conducted for print media touchpoints. After the zone area is completely in the section boundaries, the process generates a new zone 716 and the process exits at 718. Optionally, the content creator can cancel thereby bypassing 716 without generating a new zone.

Figure 8:
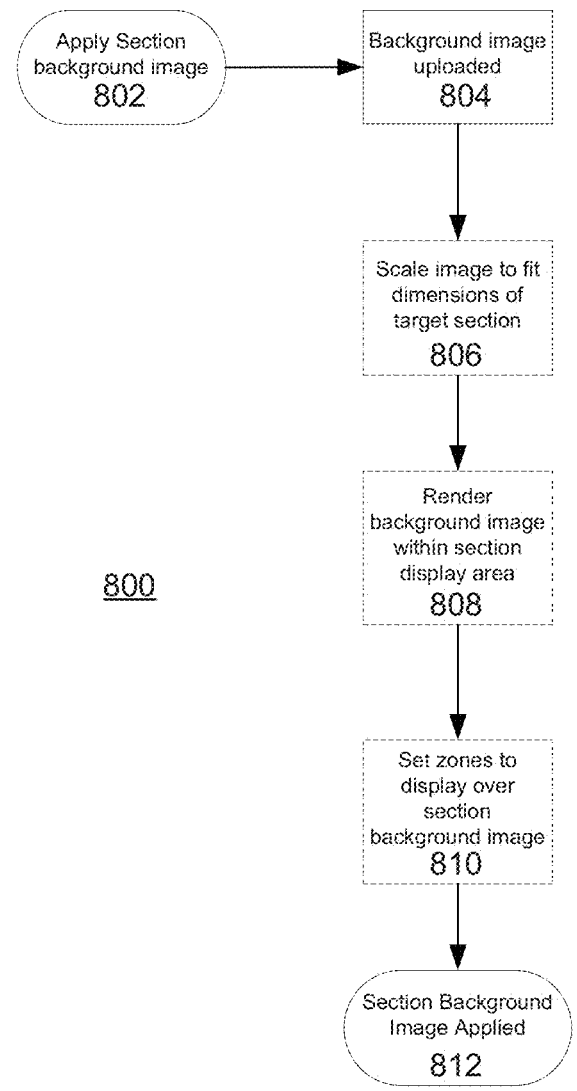
FIG. 8 is a flowchart for applying a background image to a section of a touchpoint of the present invention.

FIG. 8 is a flowchart 800 for adding a background image to a section starting at 802. The content creator selects a background image to be applied to the section in 804 which is then uploaded to the document composition server 120 which can also be a web server. If the image is too large, the image is scaled to fit the dimensions of the target section 806 and it is then rendered within the section 808 irrespective of changes to background image width and height ratios. Optionally, the content creator can manually scale the background image. Zones are then selected in 810 that will display over the background image of the section. Finally, the process exits at 812.

Figure 9A:
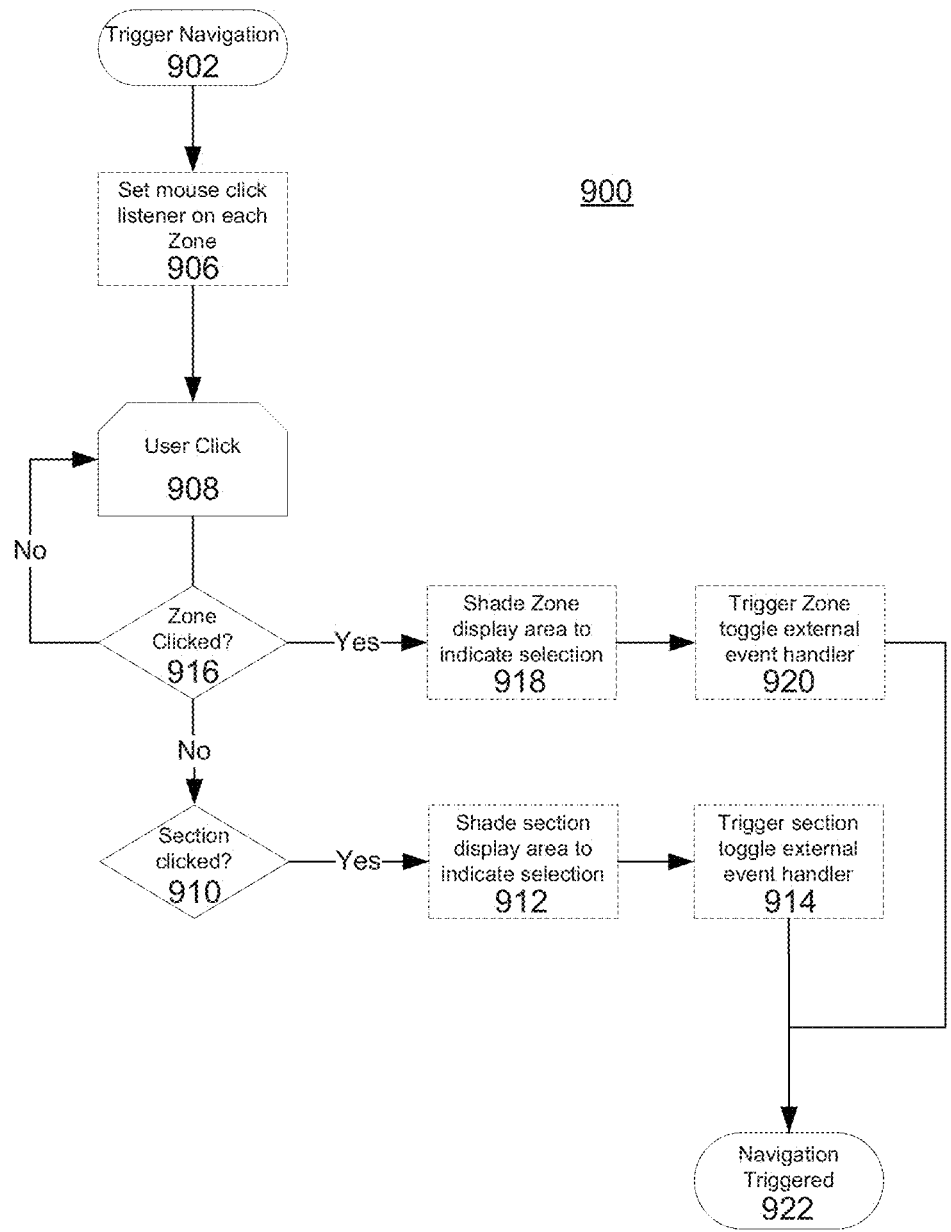
FIG. 9A is a flowchart for monitoring when a section or zone is activated in a touchpoint of the present invention.

FIG. 9A is a flowchart 900 for processing navigation triggers which are responsible for initiating interaction with application components outside of the navigation widget 302. Typically the selection of a zone or section triggers the update of a list of message content in a message list 304 or 346. The navigation trigger process enters at 902 with a mouse click listener being registered on each zone 906. The listeners monitor for input from the content creator indicating a change in which zone or section is selected. When a user clicks 908, the process checks if the click was in a zone 916 and if so, the zone display area is shaded 918 (or highlighted) to indicate selection. The external mouse click listener for that particular zone is then called at 920 in order to permit objects outside of the navigation widget 302 to respond to the content creator's actions. An example of this functionality is the message list 304 or 346 being updated when a different message zone is selected. The initialization of the external event handler is further explained with reference to 9B below. If a zone was not clicked, the process checks to see if a section change button 314 was clicked 910. If so, the section is changed to the selected section and the selected section change button 314 is shaded (or highlighted) to indicate the selected section. The external event handler is then called at 914 in order to update the entire navigation widget 302 with the selected section content. Once the external event handlers have completed their processing, the process exits at 922. If the click was outside of both the section and zone, the process returns to 908 to wait for the next click by the content creator.

FIG. 9B is a flowchart 940 for a process that initializes external event handlers where the process begins at step 942. During initialization of the navigation widget 944, the widget initialization parameters are retrieved from the application code at 946. The parameter for external event handlers is then checked to determine whether or not it is empty at 948. If the parameter is empty, the process exits at 950. If the parameter is not empty, then the navigation widget 302 is associated with the specified external event handler at 948.

Figure 10:
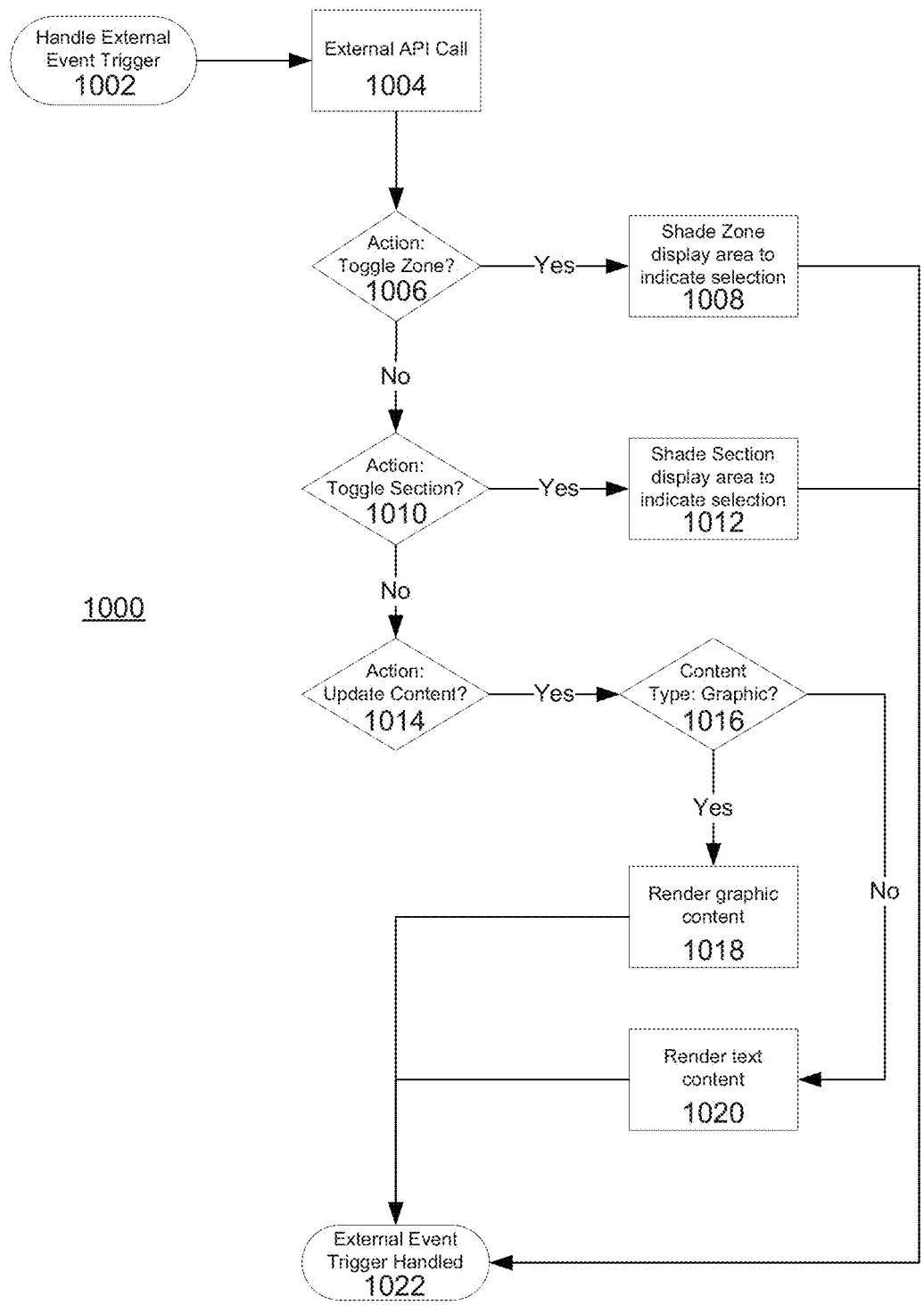
FIG. 10 is a flowchart for an event handler for navigation of a touchpoint of the present invention.

FIG. 10 is a flowchart 1000 for when the content creator interacts with panels, such as message lists 304 and 346, outside of the navigation widget 302. For ease of reading, the explanation below focuses on message list 304 but could also apply to message list 346. The process begins at 1002 where an external API call 1004 is performed to retrieve the action that was performed in the message list 304. Each row in the message list 304 corresponds to a particular zone or section of the navigation widget 302. When a content creator selects a row in the message list 304, the process 1000 determines if the retrieved message corresponds to a zone 1006 or a section 1010. If a row associated with a zone is selected, the associated zone is shaded in 1008 (or highlighted) in the navigation widget 302 to provide feedback to the content creator. If a row associated with a section is selected, the associated section is displayed and the appropriate section change buttons 314 is shaded in 1012. When the content creator has modified the contents of the row by changing the message graphics or text using the message editing window 400, an update content action is passed to the process 1000 which is detected at step 1014. A check is performed if the update is related to graphical content 1016 and if so the graphical content is rendered in 1018 (further described in reference to FIG. 11). If not, then it is assumed the content changed is textual which is rendered in 1020 (further described in reference to FIG. 12). Generally, the renderings update the preview window to display the updated content. The process then exits at 1022 once all the actions have been processed.

Figure 11:
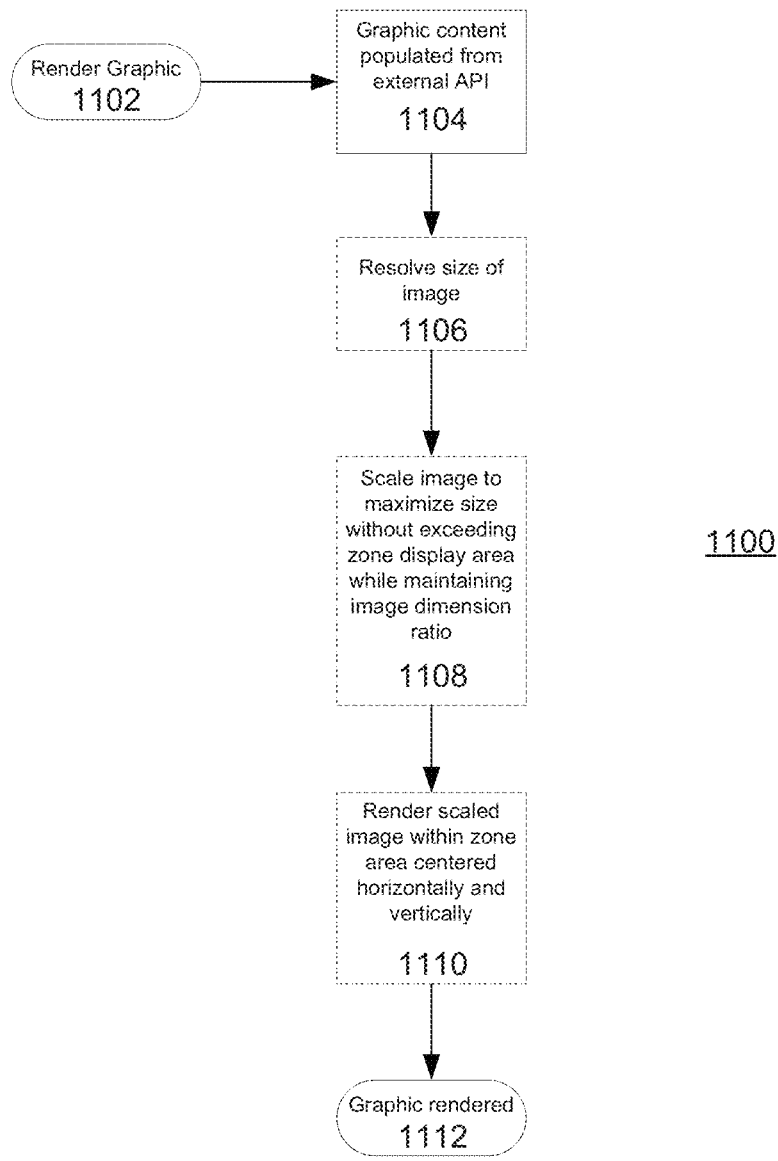
FIG. 11 is a flowchart for rendering graphics of the present invention.

FIG. 11 is a flowchart 1100 for rendering graphics in the navigation widget and starts at 1102. The graphical content is retrieved from the document composition server 120 by calling its external API in 1104. The call includes parameters to identify the content being requested (such as a message identifier and/or variant identifier). The document composition server 120 responds with the requested graphic content and the navigation widget 302 renders the content in context as further described below (e.g. in the appropriate zone and section). The size of the graphical content is obtained at 1106 and the image size is scaled 1108 to the maximum size of the zone without modifying the aspect ratio of the graphical content. The graphical content is then rendered 1110 within the zone area. The rendering typically centers the graphic horizontally and vertically within the zone. Optionally, the graphical content can be downsampled by the document composition server 120 in order to improve the speed of data transfer and display. Once the graphical content is rendered, the process exits at 1112.

Figure 12:
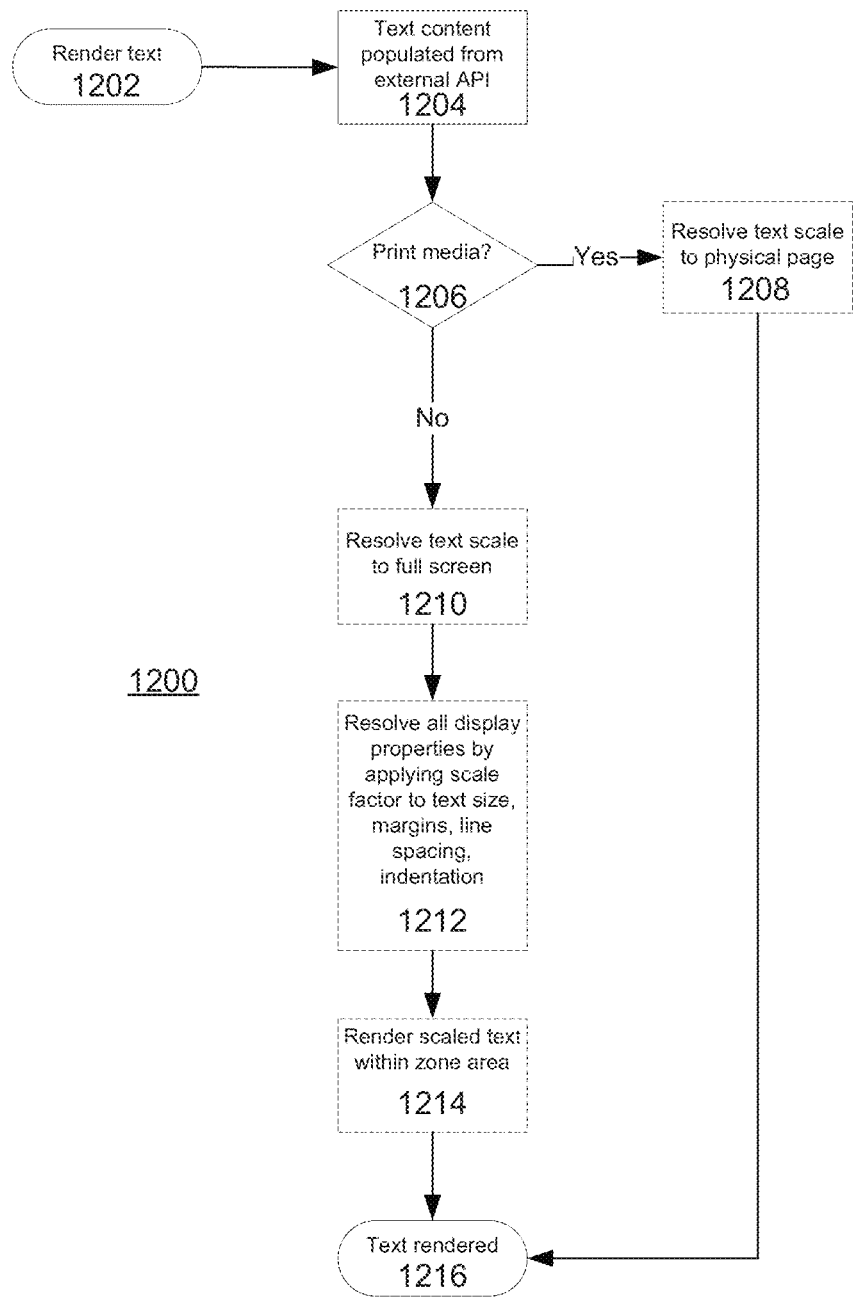
FIG. 12 is a flowchart for rendering text of the present invention.

FIG. 12 is a flowchart 1200 for rendering text in the navigation widget 302 and starts at 1202. The textual content is retrieved from the document composition server 120 by calling its external API in 1204 and is provided in the form of HTML. The call to the document composition server 120 includes parameters to identify the content being requested (such as a message identifier and/or variant identifier). The document composition server 120 responds with the requested text content and the navigation widget 302 renders the content in context as further described below (e.g. in the appropriate zone and section). The HTML may apply numerous display properties, for example, margins, indentation, color, font size, fond, bolding, italics, and underlining. The process verifies if the touchpoint is for print media 1206. If so, the text scale is resolved at step 1208 from a ratio of rendered size to physical page size (e.g. 1"=72 px). If the touchpoint is not print media, then the text scale is resolved at step 1210 from a ratio of rendered size to full screen rendering. All the display properties are then resolved at step 1212 by applying scale factors to text size, margins, line spacing, and indentation. When rendering spatial properties, such as margins or indentation, the properties are scaled relative to the applied touchpoint scaling. For example, if the navigation widget 302 was being rendered ¼ actual size then all applicable text content properties would also be rendered ¼ actual size. Finally, the scaled text is then rendered at step 1214 within the zone area. The process exits at step 1216.

Another embodiment of the present invention is a Messaging and Campaign Simulator that allows business users to manage virtual production runs to test and measure the performance of planned messages and campaigns. Allows business and operations a predictive process to assess cost drivers such as insert order quantities and page counts.

Another embodiment of the invention delivers support to front line staff and customer service by providing messaging information on customers they speak to, by providing scripts to further reinforce the messages, by delivering the capability to capture customer responses, and by integrating with archive systems to view customer documents.

In one embodiment, the invention provides the first enterprise system for Customer Touchpoint Management (CTM) for marketing and product managers to manage, track and measure one to one communications with their customers. The invention may be implemented in industries such as, for example, financial services, banking, health care, retail, utilities, telecommunications, e-commerce transactions, Internet or online auctions, Internet or online purchases, Internet or online sales, Internet or online gaming, and insurance.

Although the embodiments above are described with the selection of only one message zone 308, the inventor contemplates that multiple message zones 308 can by selected (by for example, pressing the control key or shift key and the left mouse button). When multiple message zones 308 are selected, the message list 304 could be a combination of the messages the correspond to all of the selected message zones 308.

In further embodiments, the inventor contemplates that for electronic media, the content creator is able to select a display type for navigation widget in order to simulate different display sizes. For example, the display type could be selected to be a smartphone, tablet, large screen display, etc.

Features of the embodiments described herein may include, for example: an agnostic enterprise CTM solution, compatible with multiple document composition technologies; scalable, high volume processing capability to deliver complex, customer messaging to a variety of message delivery formats and channels; message authoring by the business and marketing people; and full functionality in a distributed environment.

The system may be implemented on enterprise servers, web-based servers, and personal computers, laptop computers, hand held devices (e.g., PDAs) or any processing module with adequate processing functionality and memory capacity.

Although the embodiments of the present invention are described with reference to a mouse, the inventor contemplates that it could be applied to touchscreens, trackpads, camera-based interactive systems, or other input systems known in the art.

A person skilled in the art would appreciate that numerous modifications of the present invention are possible in light of the above description. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention such as those disclosed herein and below.

A system for managing hierarchical content from a plurality of messages comprising: a document composition server having a message database containing the plurality of messages stored on a first computer readable medium; computer executable instructions on a second computer readable medium for: displaying a user interface with a navigation widget and a message list, the navigation widget having a plurality of message zones for receiving message content from the message database; selecting a message zone and updating the message list to show only those messages specific to that message zone from the message database; and selecting a message from the message list and rendering the message content in the message zone for the selected message. The system wherein the navigation widget has a plurality of sections.

The system further comprising instructions for changing the section by selecting at least one section change button. The system further comprising instructions for highlighting or shading the selected message zone. The system wherein the navigation widget can be for a print media or an electronic media. The system further comprising instructions for if the navigation widget is for print media, rendering the message based on predetermined dimensions and if the navigation widget is for electronic media, rendering the message for a screen of a display. The system further comprising instructions for automatically scaling the message zone to the dimensions of the section. The system further comprising instructions for editing the message and updating the navigation widget with the edited message. The system further comprising instructions for displaying a temporary message preview window when a mouse pointer hovers over a message in the message list.

A machine implemented method for managing hierarchical content from a plurality of messages comprising: providing a message database containing the plurality of messages on a first computer readable medium and accessible by a document composition server; displaying a user interface with a navigation widget and a message list, the navigation widget having a plurality of message zones for receiving message content from the message database; selecting a message zone and updating the message list to show only those messages specific to that message zone from the message database; and selecting a message from the message list and rendering the message content in the message zone for the selected message. The method wherein the navigation widget has a plurality of sections.

The method further comprising changing the section by selecting at least one section change button. The method further comprising highlighting or shading the selected message zone. The method wherein the navigation widget can be for a print media or an electronic media. The method further comprising if the navigation widget is for print media, rendering the message based on predetermined dimensions and if the navigation widget is for electronic media, rendering the message for a screen of a display. The method further comprising automatically scaling the message zone to the dimensions of the section. The method further comprising editing the message and updating the navigation widget with the edited message. The method further comprising displaying a temporary message preview window when a mouse pointer hovers over a message in the message list.

The invention claimed is:

1. A system for managing hierarchical content from a plurality of messages comprising:
   a document composition server comprising a processing unit in communication with a first non-transitory computer readable medium having a message database containing the plurality of messages stored on the first non-transitory computer readable medium;
   computer executable instructions stored on a second non-transitory computer readable medium in communication with the processing unit for:
      displaying a user interface with a navigation widget and a message list, the navigation widget having a plurality of sections of which one is shown, each section having a plurality of message zones for receiving message content from the message database, the message list displaying messages specific to the shown section;
      in response to receiving input to edit a message from the message list, setting message content of the message being edited as customized, inherited, or suppressed, wherein an inherited message content has the same content as a selected higher level in the hierarchical content and a suppressed message content does not have the same contents of any higher levels in the hierarchical content;
      in response to receiving input selecting a message zone in the shown section, updating the message list to show only those messages specific to the selected message zone from the message database, each entry in the message list indicating whether message content of the message has been customized, inherited, or suppressed from higher levels in the hierarchical content;
      in response to receiving input selecting a message from the message list, rendering the message content in the message zone for the selected message; and
      in response to receiving input on a button on the user interface, displaying a list of targeting rules, wherein the targeting rules identify a group of recipients.

2. The system for managing hierarchical content according to claim 1 further comprising instructions for changing the shown section by selecting at least one section change button.

3. The system for managing hierarchical content according to claim 2 further comprising instructions for highlighting or shading the selected message zone.

4. The system for managing hierarchical content according to claim 3 further comprising instructions to configure the navigation widget to be for a print media or for an electronic media.

5. The system for managing hierarchical content according to claim 4 further comprising instructions for rendering the selected message based on predetermined dimensions if the navigation widget is configured to be for the print media.

6. The system for managing hierarchical content according to claim 4 further comprising instructions for rendering the selected message for dimensions of a display screen if the navigation widget is configured to be for the electronic media.

7. The system for managing hierarchical content according to claim 6 further comprising instructions for automatically scaling the message zone to the dimensions of the section.

8. The system for managing hierarchical content according to claim 7 further comprising instructions for editing the selected message and updating the navigation widget with the edited selected message.

9. The system for managing hierarchical content according to claim 1 further comprising instructions for rendering a temporary message preview window when a mouse pointer hovers over a message in the message list.

10. A machine-implemented method for managing hierarchical content from a plurality of messages comprising:

providing a message database containing the plurality of messages on a first non-transitory computer readable medium accessible by a document composition server;

displaying a user interface with a navigation widget and a message list, the navigation widget having a plurality of sections of which one is shown, each section having a plurality of message zones for receiving message content from the message database, the message list displaying messages specific to the shown section;

in response to receiving input to edit a message from the message list, setting message content of the message being edited as customized, inherited, or suppressed, wherein an inherited message content has the same content as a selected higher level in the hierarchical content and a suppressed message content does not have the same contents of any higher levels in the hierarchical content;

in response to receiving input selecting a message zone in the shown section, updating the message list to show only those messages specific to the selected message zone from the message database, each entry in the message list indicating whether message content of the message has been customized, inherited, or suppressed from higher levels in the hierarchical content;

in response to receiving input selecting a message from the message list, rendering the message content in the message zone for the selected message; and in response to receiving input on a button on the user interface, displaying a list of targeting rules, wherein the targeting rules identify a group of recipients.

11. The machine-implemented method according to claim 10 further comprising changing the shown section by selecting at least one section change button.

12. The machine-implemented method according to claim 11 further comprising highlighting or shading the selected message zone.

13. The machine-implemented method according to claim 12 further configuring the navigation widget to be for a print media or for an electronic media.

14. The machine-implemented method according to claim 13 further comprising rendering the selected message based on predetermined dimensions if the navigation widget is configured to be for the print media.

15. The machine-implemented method according to claim 13 further comprising rendering the selected message for dimensions of a display screen if the navigation widget is configured to be for the electronic media.

16. The machine-implemented method according to claim 15 further comprising automatically scaling the message zone to the dimensions of the section.

17. The machine-implemented method according to claim 16 further comprising editing the selected message and updating the navigation widget with the edited selected message.

18. The machine-implemented method according to claim 17 further comprising rendering a temporary message preview window when a mouse pointer hovers over a message in the message list.

* * * * *